Figure 1:
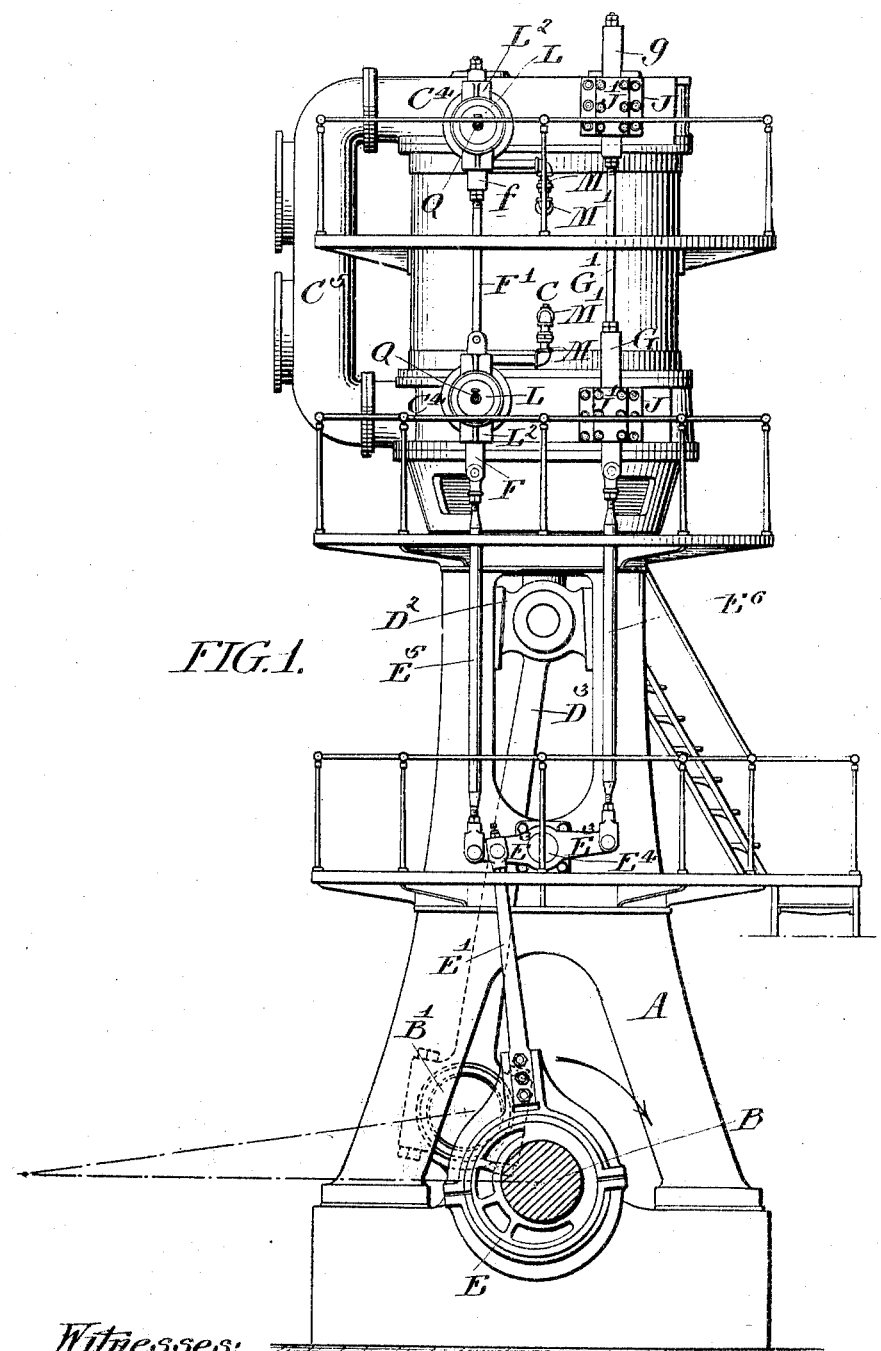

No. 784,122. PATENTED MAR. 7, 1905.
G. B. PETSCHE.
BLOWING ENGINE OR COMPRESSOR.
APPLICATION FILED APR. 20, 1903.

5 SHEETS—SHEET 1.

Witnesses:

Inventor
Gustav B. Petsche

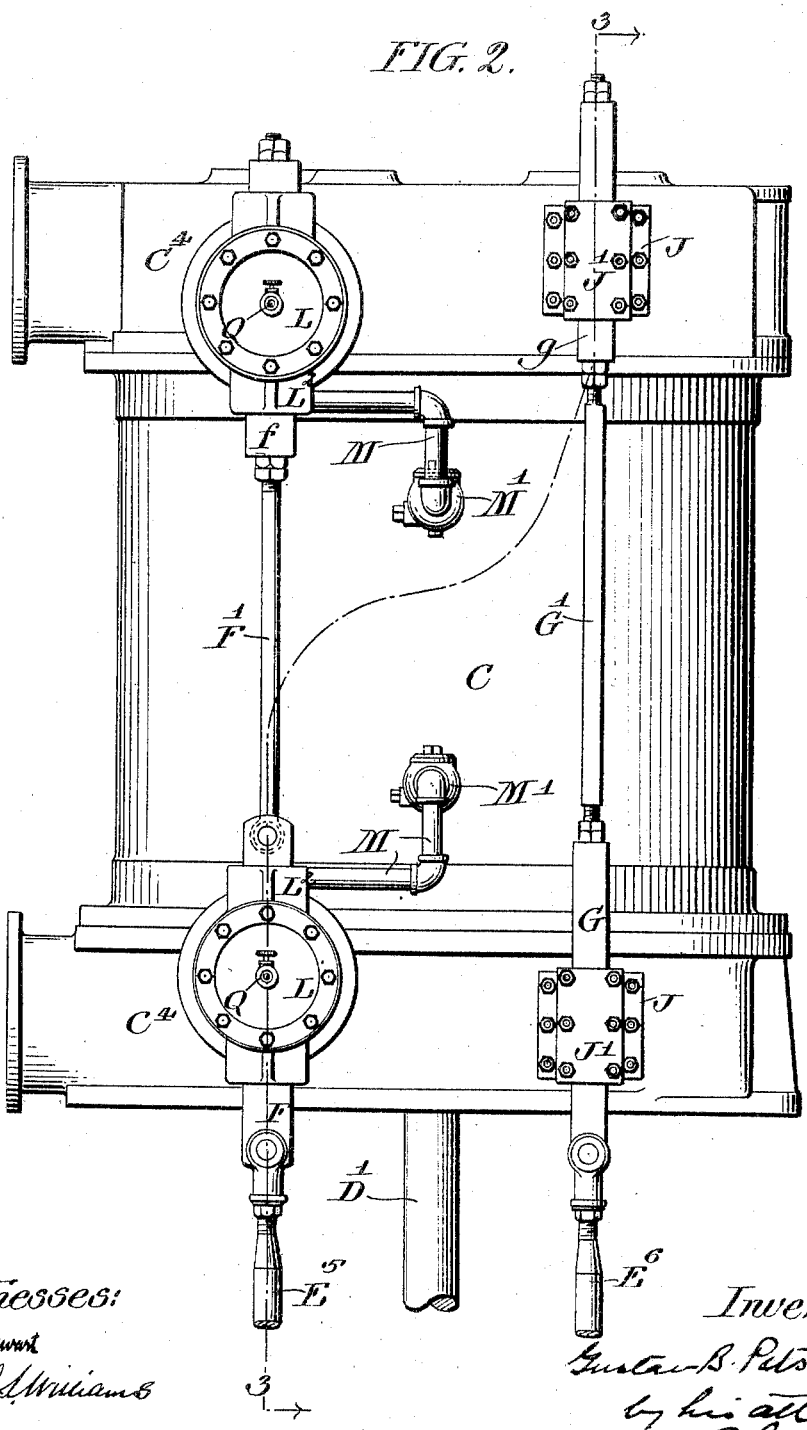

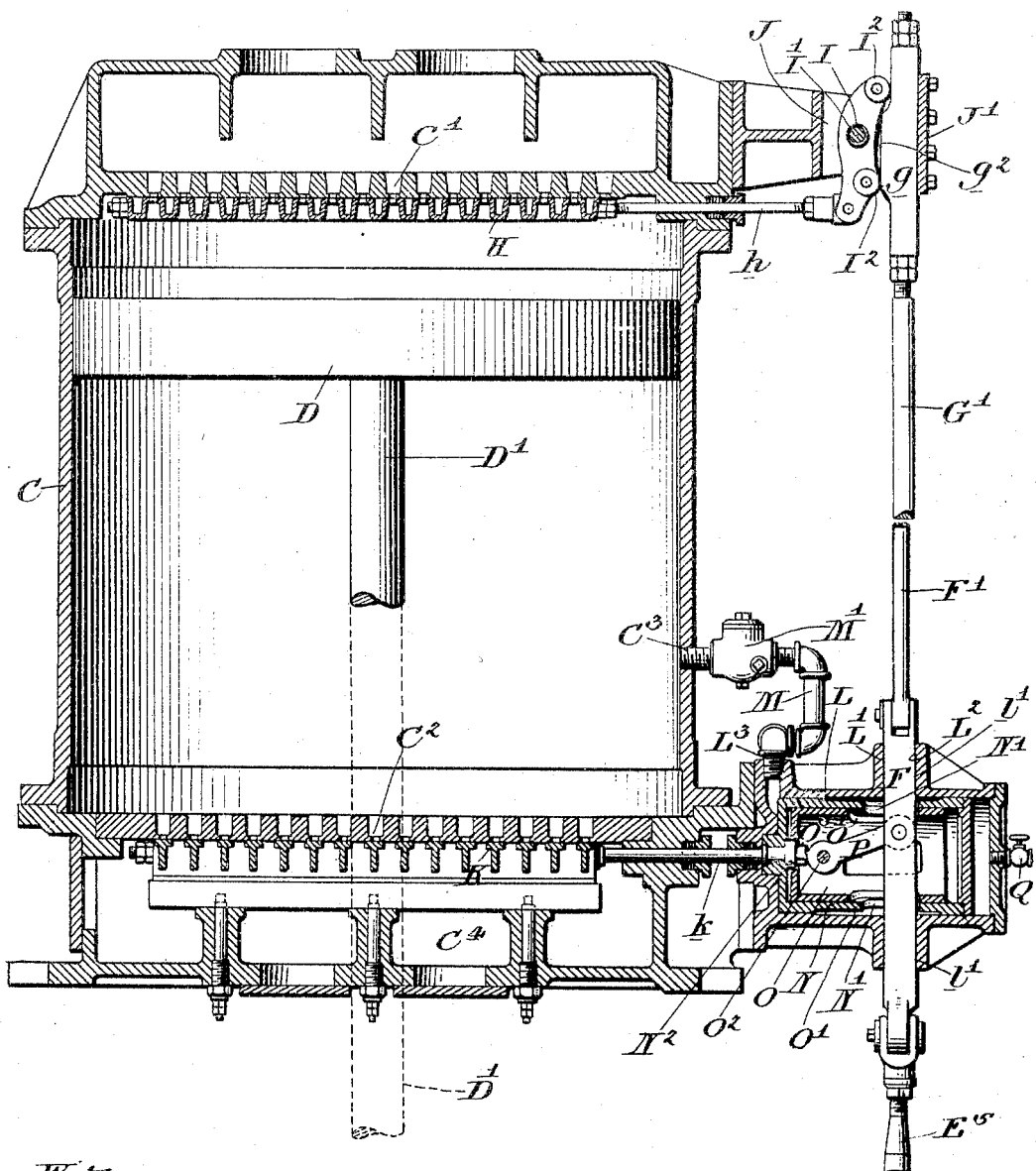

No. 784,122. PATENTED MAR. 7, 1905.
G. B. PETSCHE.
BLOWING ENGINE OR COMPRESSOR.
APPLICATION FILED APR. 20, 1903.
5 SHEETS—SHEET 4.
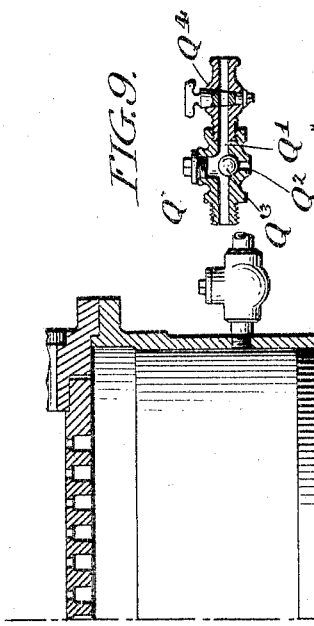
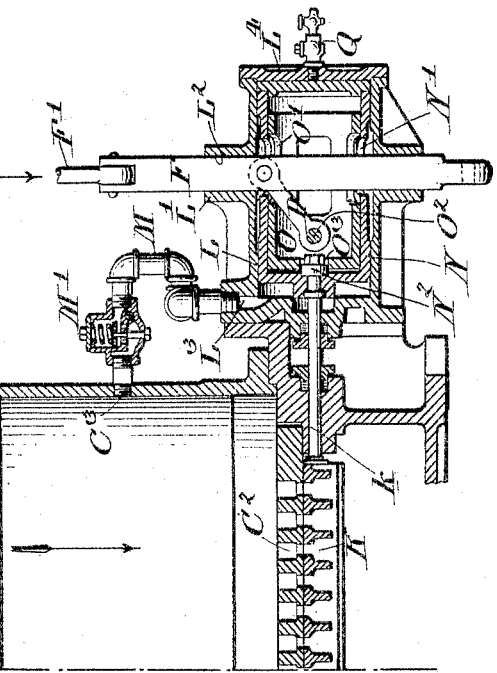
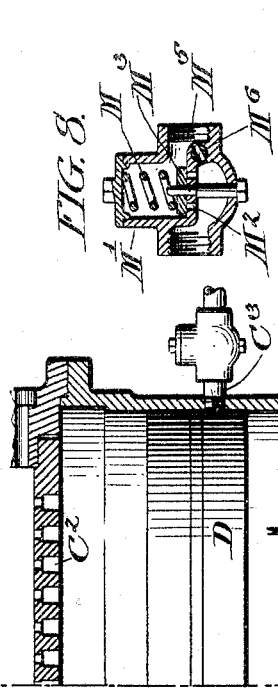
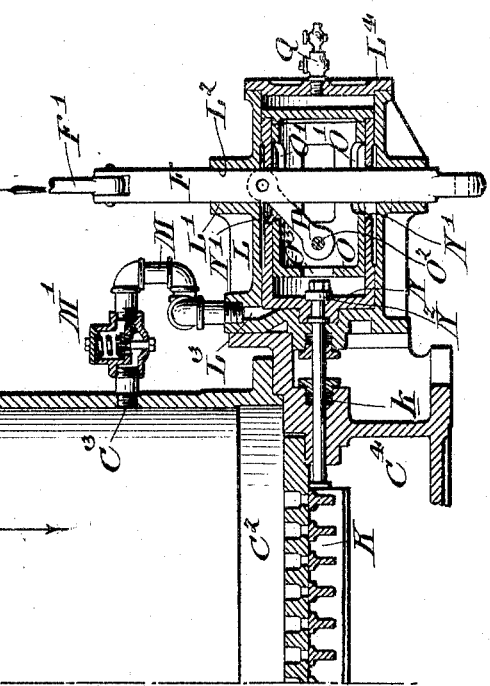
Witnesses: Inventor:

No. 784,122. PATENTED MAR. 7, 1905.
G. B. PETSCHE.
BLOWING ENGINE OR COMPRESSOR.
APPLICATION FILED APR. 20, 1903.
5 SHEETS—SHEET 5.
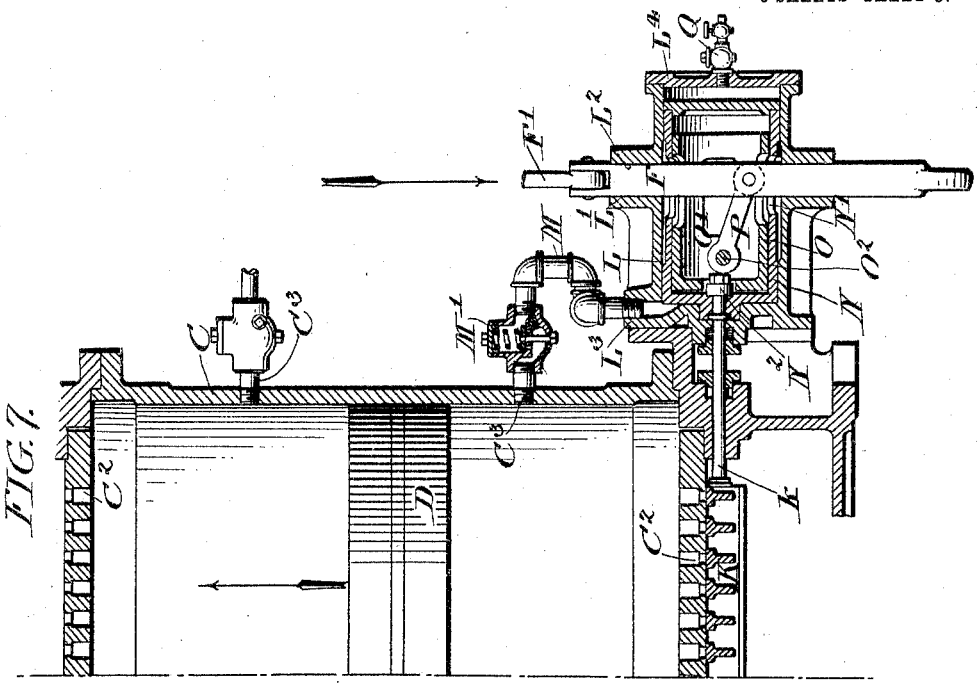
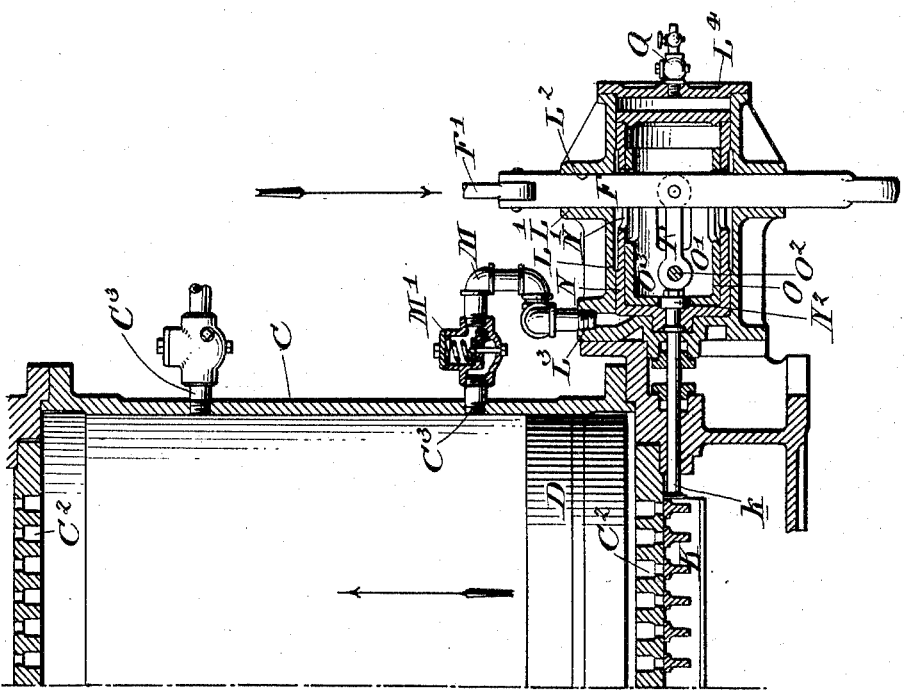
Witnesses:
Inventor:
Gustav B. Petsche No. 784,122.

Patented March 7, 1905.

UNITED STATES PATENT OFFICE.

GUSTAV BERNHARD PETSCHE, OF PHILADELPHIA, PENNSYLVANIA, ASSIGNOR TO THE SOUTHWARK FOUNDRY & MACHINE COMPANY, OF PHILADELPHIA, PENNSYLVANIA, A CORPORATION OF PENNSYLVANIA.

BLOWING-ENGINE OR COMPRESSOR.

SPECIFICATION forming part of Letters Patent No. 784,122, dated March 7, 1905.

Application filed April 20, 1903. Serial No. 153,450.

*To all whom it may concern:*

Be it known that I, GUSTAV BERNHARD PETSCHE, a subject of the Emperor of Germany, residing in the city and county of Philadelphia, in the State of Pennsylvania, have invented certain new and useful Improvements in Blowing-Engines or Compressors, of which the following is a true and exact description, reference being had to the accompanying drawings, which form a part thereof.

My invention relates to blowing-engines or compressors, and has for its object to provide an improved valve-actuating mechanism for such engines, and particularly to provide a means for closing the delivery-valves leading from the compressing-cylinders, which will be of great mechanical simplicity and at the same time efficient and accurate in its mode of operation.

The nature of my improvements will be best understood as described in connection with the drawings, in which they are illustrated, and in which—

Figure 1 is a side elevation of a vertical blowing-engine constructed in accordance with my invention. Fig. 2 is an enlarged side elevation of the compressing-cylinder, showing the valve-actuating mechanism. Fig. 3 is a cross-sectional view taken through the compressing-cylinders and valve-actuating devices on the irregular line 3 3 of Fig. 2. Figs. 4, 5, 6, and 7 are sectional views taken through the compressing-cylinder on the same plane as the lower part of the section, Fig. 3, and showing the operation of the delivery-valve opening and closing mechanism progressively. Fig. 8 is a sectional view, on a somewhat enlarged scale, of the check-valve M'; and Fig. 9 is a sectional view of the restricted air-escape cock, shown in the drawings at Q.

A indicates the framing of the engine; B, the main driving-shaft, having connected with it a crank or cranks (indicated at B') by which the shaft B is actuated and to which is also connected the connecting-rod $D^3$, pivoted at its upper end to the cross-head $D^2$, which in turn is connected by the piston-rod D', (see Fig. 3,) with the compressing-piston D moving in the compressing-cylinder C. The compressing-cylinder has at each end gridiron valve-seats for the entrance and delivery of air, the entrance-ports being indicated at C' and the delivery-ports at $C^2$.

$C^2 C^3$ indicate ports through the sides of the compressing-cylinder, the purpose of which will be hereinafter described, and $C^4$ indicates the receiving-chambers into which the delivery-ports $C^2$ open, these chambers being, as shown in Fig. 1, connected by a union $C^5$, from which lead the delivery pipe or pipes to which the compressed air is fed.

E (see Fig. 1) is an eccentric secured on the shaft B and connected through an eccentric strap and rod E' with a rocking lever, (indicated at $E^3 E^2$,) said lever being pivoted at $E^4$.

$E^5$ and $E^6$ are connecting-rods leading from the opposite arms of the rock-lever and connecting, respectively, with the slides, (indicated at F and G,) such slides being in turn connected with other and similar slides, *f* and *g*, by the connecting-rods shown at F' and G'.

H (see Fig. 3) indicates one of the admission-valves moving over the admission-port C' and having a valve-rod *h*, which is connected to the cam-actuated lever I, pivoted on a bracket J, extending out from the head of the compressing-cylinder at I' and having cam-rolls $I^2 I^2$, which rest upon a cam, such as is indicated at $g^2$, one such cam being secured to or formed on each slide G and *g*, and the slides being adjusted and held to normal operative position by means of plates J', which hold such slides in guideways formed in brackets J. It will readily be seen that the reciprocating motion imparted to the slides G and *g* by the mechanism leading from the eccentric E will bring about the opening and closing of the admission-valves H at proper times.

K is one of the delivery-valves working over the valve-seat $C^2$, with its back exposed to the pressure in the receiver $C^4$, so that the delivery-valve is held to its seat by a pressure indicated by the difference between the pressures existing at any time in the receiver and in the adjacent part of the compressing-cylinder.

$k$ is the valve-stem of the delivery-valve, which extends through a stuffing-box into the valve-actuating cylinder L, which cylinder is formed with laterally-extending bosses L', through which is formed the guideway indicated at $L^2$.

$L^3$ indicates an admission-port leading into the front end of the cylinder L, and $L^4$ the rear head of the said cylinder.

M indicates a conduit leading from the port $C^3$ in the compressing-cylinder to the port $L^3$ of the valve-actuating cylinder, and in this conduit is preferably provided a valve, such as is indicated at M' and the construction of which is shown in Fig. 8, $M^2$ indicating the ports of the valve normally closed by a valve $M^3$, held to its seat by a spring $M^4$. A port $M^5$ is also formed in the valve-casing and has working in it a regulating-cock, (indicated at $M^6$.)

N indicates the piston working in the cylinder L and to the front of which is attached the valve-stem $k$. This piston is constructed with a longitudinal guideway lying in the rear of its front face and preferably is made in the form of a cylinder closed at both ends, the inner face of the cylindrical piston serving the purpose of the guideway. Lateral openings, as indicated at N', are formed through the walls of the cylindrical piston, preferably in the form of slots, to give passage to the slide F, which extends through the cylinder L and moves in the guideways $L^2$. The front head of the cylindrical piston N is preferably formed or provided with an inwardly-extending circular boss, such as is indicated at $N^2$.

O is a slide fitting and moving in the hollow piston N and formed with lateral openings O' to give passage to the slide F. By preference the front end of the slide is closed with the exception of a central circular opening $O^3$, made to conform with and fit the boss $N^2$.

P is a link pivotally connecting the slide O with the slide F, the connection being preferably made to a point on the slide F which in its regular movements moves alternately above and below the point of connection with the head O.

Q is a regulating air-escape device secured in the head $L^4$ of the cylinder L and preferably having the construction indicated in Fig. 9—that is to say, the device is provided with a passage Q', which is regulated by means of a cock $Q^4$ and from which leads a lateral opening (indicated at $Q^2$) which is closed by a ball-valve $Q^3$, which ball readily moves to admit air, but remains firmly seated as against the outward movement of the air in the cylinder.

The operation of my blowing-engine can be readily followed, and it will be seen that the motions imparted to the slides F $f$ and by them through the links P to the slides O and also the motions imparted to the cam-slides G and $g$ and through them to the admission-valves is all positive, being derived from the eccentric E and timed exactly with the movements of the other positively-moving parts of the engine. It will also be obvious that the movement imparted to the slide O, which moves it toward the inner end of the cylinder L, will bring it into contact with the piston N and will move said piston, and through it the delivery-valve K, in a direction to close said valve and to an extent which will close said valve, so that obviously the closure of the delivery-valves, like the movements both in opening and closing of the admission-valves, is positively regulated and occurs in a fixed relation to the movements of the engine.

The opening movement of the delivery-valves should be effected by a mechanism which will cause said valve to open at, or practically at, the point in the movement of the compressing-piston D toward it when the pressure within the cylinder is equal to the pressure in the receiver. Many devices have been provided having this function, and the modes of operation of all of them are capable of use with the valve-closing mechanism which forms the essential novel feature of my present invention. As shown in the drawings, the valve-opening device consists of the combination of the cylinders L and piston N, the front end of the cylinder being connected, through its port $L^3$, with the lateral port $C^3$ of the compressing-cylinder, so that as the piston D moves toward the delivery-valve the increasing pressure on its face is transmitted through the conduit M to the face of the piston N, tending to move the valve K in the direction to open it; but said valve, being held to its seat by the pressure in the receiver, will not move under the pressure transmitted to the face of the piston N until the pressures in the compressing-cylinder and in the receiver are substantially equal, at which point the valve will move to open with great rapidity, and to take up and check the momentum of the parts in opening I form the cylinder L with a closed rear end and provide the hollow piston N with a closed rear end, so that the air will be compressed between the rear ends of the piston and cylinder and act as a cushion to check the motion of the parts; but to avoid any rebound of the piston I provide the restricted air-escape passage, (indicated at Q,) the compressed air escaping from the end of the cylinder with a speed regulated by the adjustment of the cock $Q^4$, while on the return motion of the piston the air enters freely through the passage $Q^2$.

The operation of the valve-closing device can be readily followed in Figs. 4 to 7, inclusive, of the drawings. In Fig. 4 the slide F is shown at nearly the top of its upward movement, and it will be seen how at this time the piston-slide O is retracted in the hollow piston N to the full extent of its rearward motion. In Fig. 5 the slide F has reversed its direction of movement, but the link P is still practically in the same position and the slide O in practically the same position with regard to the cylinder L; but in moving from the position shown in Fig. 4 to that shown in Fig. 5 the air beneath the piston D has been compressed until it equals in pressure the air in the receiver, and the compressed air passing through the conduit M and acting on the face of the piston N has moved said piston backward, fully opening the valve K. It is to prevent a blow due to the impact of the piston on the slide O that I use the cushioning device, consisting of the head of the slide O with its perforation $O^3$, and the boss $N^2$ on the piston, and it will be seen that as the piston moves backwardly the air will escape freely from the space between it and the head of the slide until the boss $N^2$ enters the opening $O^3$, whereupon the escape of the air will be checked and the confined portion of air will act as a cushion. I have already explained how the backward motion of the piston N is checked by providing a restricted air-escape device Q at the rear end of the piston L. In Fig. 6 I have shown the piston D at the beginning of its return stroke and the slide F still moving downward, the position illustrated being that in which the slide F has moved the link P to horizontal position and through it has moved the slide O to position to fully close the valve K, though it will readily be seen that actual closure has occurred before this position is attained and at the time when the piston D has just reached its lowermost position in its downward movement. In Fig. 7 I have shown the next succeeding stage of the operation—namely, that in which the slide F has reached the end of its downward movement, carrying the attached end of the link P below the pivot-point $O^2$, where it is attached to the slide O—and it will readily be seen that in passing from the position shown in Fig. 7 to that shown in Fig. 4 or, indeed, that shown in Fig. 5 the slide F in no wise affects the position of the valve K. In passing from the position shown in Fig. 6 to that shown in Fig. 7 the slide O is slightly retracted, as shown in Fig. 7, and as the slide F again moves upward the slide O is moved back to the position shown in Fig. 4, in which position it substantially remains after the reversal of movement of the slide F and until the opening movement of the valve K has occurred. The period in which the slide O is practically retracted to its full extent should and does cover the full range of pressures at which in any normal working or the blowing-engine the delivery-valve is at all likely to be opened.

Having now described my invention, what I claim as new, and desire to secure by Letters Patent, is—

1. In a blowing-engine, the combination of a delivery-valve with means acting to open said valve when the pressures in the compressing cylinder and receiver are substantially equal, a reciprocating device positively actuated by a moving part of the engine, another reciprocating device acting when moved in one direction to close the valve and when moved in the other direction to leave it free to open, said device moving in a path substantially at right angles to that of the positively-actuated device aforesaid and a link connected with the valve-closing device and connected also to a point on the positively-actuated device which moves alternately above and below the link's point of connection with the valve-closing device.

2. In a blowing-engine, the combination with a delivery-valve of a cylinder and a piston moving in said cylinder and connected to said valve, means for admitting pressure fluid to the cylinder to actuate the piston to open the valve, a reciprocating device actuated by a positively-moving part of the engine and moving in a path substantially transverse to the axis of the cylinder, a slide, movable in the rear of and substantially parallel to the piston and adapted to move said piston and its connected valve to close said valve and a link connected to said slide and to a point on the positively-actuated device which moves alternately above and below the point of connection with the slide.

3. In a blowing-engine, the combination with a delivery-valve of a cylinder having an admission-port for pressure fluid at its inner end, a piston in said cylinder connected to actuate the valve and having a longitudinal guideway formed in it in the rear of its front face, a slide movable in the guideway of the piston, a reciprocating device actuated by a positively-moving part of the engine and moving transversely to the axis of the cylinder, and a link connected to the slide in the piston and to a point on the positively-actuated device which moves alternately above and below the point of attachment with the slide.

4. In a blowing-engine, the combination with a delivery-valve of a cylinder having an admission-port for pressure fluid at its inner end, a restricted air-escape at its outer end, and a transverse passage formed through its walls, a piston in said cylinder connected to actuate the valve and having a longitudinal guideway formed in it in the rear of its front face, a slide movable in the guideway of the piston, a reciprocating device actuated by a positively-moving part of the engine and moving through the passage in the walls of the cylinder transversely to the axis of the cylinder, and a link connected to the slide in the piston and to a point on the positively-actuated device which moves alternately above and below the point of attachment with the slide.

5. In a blowing-engine, the combination with a delivery-valve of a cylinder having an admission-port for pressure fluid at its inner end and a restricted air-escape passage at its rear end, said cylinder having a guideway $L^2$, formed through its sides, a piston in said cylinder connected to actuate the delivery-valve, said piston having a longitudinal guideway formed in it intermediate of its ends and a transverse passage $N'$, formed through its sides, a slide longitudinally movable in the guideway formed in the piston, a reciprocating slide F, actuated by a moving part of the engine, said slide being movable in the guideways $L^2$, of the cylinder and through the passage $N'$, in the piston, and a link connected to the slide in the piston and to a point on the slide F, which moves alternately above and below the point of attachment to the piston-slide.

6. In a blowing-engine, the combination with a delivery-valve of a cylinder having an admission-port for pressure fluid at its inner end, a piston in said cylinder connected to actuate the valve and having a longitudinal cylindrical guideway formed in it in the rear of its front face, a piston-like slide movable in the guideway of the piston, said piston-slide having a circular opening in its front face and the valve-actuating piston having a circular projection $O^3$, adapted to fit in said opening, a reciprocating device actuated by a positively-moving part of the engine and moving transversely to the axis of the cylinder, and a link connected to the slide in the piston and to a point on the positively-actuated device which moves alternately above and below the point of attachment with the slide.

7. In a blowing-engine, having admission and delivery valves, and means, acting to open the delivery-valves when the pressures in the compressing-cylinder and in the receiver are substantially equal, the combination of slides G, $g$, arranged to actuate the admission-valves in both directions, slides F, $f$, moving reciprocally with the slides G, $g$, means actuated by a positively-moving part of the engine to impart a reciprocating motion to said slides, slides O, $o$, arranged when moved in one direction to close the delivery-valves and links connected to said last-mentioned slides and to the slides F, $f$, at points which move alternately above and below the points of attachment to slides O, $o$, whereby said slides O, $o$, are actuated.

8. In a blowing-engine, the combination of a delivery-valve with means acting to open said valve when the pressures in the compressing-cylinder and receiver are substantially equal, a reciprocating device positively actuated by a moving part of the engine, a second reciprocating device moving in a path transverse to the first, and operating when moved in one direction to close the valve, and when moved in the other direction to leave it free to open, a link coupling the two reciprocating devices and connected to a point on the first which moves alternately above and below its point of attachment to the second, an air-cushioning device arranged to check the momentum of the valve and connected parts when moving to open the ports, and an air-cushioning device interposed between the second reciprocating device aforesaid and the part of the valve-connected mechanism upon which it operates when closing the valve.

GUSTAV BERNHARD PETSCHE.

Witnesses:
 CHAS. F. MYERS,
 D. STEWART.